(12) United States Patent
Malsam et al.

(10) Patent No.: US 7,461,798 B1
(45) Date of Patent: Dec. 9, 2008

(54) COLLECTOR RING FOR A CENTER PIVOT IRRIGATION MACHINE

(76) Inventors: Craig S. Malsam, 17914 Shirley Cir., Omaha, NE (US) 68130; Donald M. Salazar, 6167 S. 182nd St., Omaha, NE (US) 68135; Mark G. Schechinger, 1001 15th St., Harlan, IA (US) 51537; Joseph F. Novotny, 15534 Newell St., Omaha, NE (US) 68138

(*) Notice: Subject to any disclaimer, the term of this patent is extended or adjusted under 35 U.S.C. 154(b) by 399 days.

(21) Appl. No.: 11/358,590

(22) Filed: Feb. 20, 2006

(51) Int. Cl.
*B05B 3/00* (2006.01)
*B05B 12/08* (2006.01)
*A01G 25/02* (2006.01)
*A01G 27/00* (2006.01)
*B67D 5/08* (2006.01)
*B67D 5/38* (2006.01)
*G05D 7/00* (2006.01)

(52) U.S. Cl. .................. 239/728; 239/63; 239/64; 239/65; 239/66; 239/67; 239/68; 239/69; 239/70; 239/71; 239/72; 239/73; 239/74; 700/284; 318/266; 318/466; 318/464; 318/39

(58) Field of Classification Search .......... 239/728, 239/63–74; 700/284; 318/266, 466, 464, 318/39
See application file for complete search history.

(56) References Cited

U.S. PATENT DOCUMENTS

| 2,654,882 | A | * | 10/1953 | Ergen | 701/204 |
| 3,936,117 | A | * | 2/1976 | Reinke | 239/728 |
| 4,063,569 | A | * | 12/1977 | Olson et al. | 239/1 |
| 4,161,292 | A | * | 7/1979 | Holloway et al. | 239/11 |
| 4,186,763 | A | * | 2/1980 | Ferguson et al. | 239/728 |
| 4,262,694 | A | * | 4/1981 | McConnell | 239/728 |
| 4,662,563 | A | * | 5/1987 | Wolfe, Jr. | 239/1 |
| 4,899,934 | A | * | 2/1990 | Krisle | 239/1 |
| 5,678,771 | A | * | 10/1997 | Chapman | 239/727 |
| 5,927,603 | A | * | 7/1999 | McNabb | 239/63 |
| 6,666,384 | B2 | * | 12/2003 | Prandi | 239/1 |
| 6,928,339 | B2 | * | 8/2005 | Barker | 700/284 |
| 2002/0134868 | A1 | * | 9/2002 | Hansen | 239/728 |

* cited by examiner

*Primary Examiner*—Steven Cernoch
(74) *Attorney, Agent, or Firm*—Thomte Patent Law Office; Dennis L. Thomte

(57) ABSTRACT

A collector ring for use with a center pivot irrigation system which permits the mounting of a communication device above the span structure. The collector ring also includes a monitoring device which senses the angle or rotation of the span structure with respect to the fixed center pivot structure.

16 Claims, 8 Drawing Sheets

COLLECTOR RING FOR A CENTER PIVOT IRRIGATION MACHINE

BACKGROUND OF THE INVENTION

1. Field of the Invention

This invention relates to a collector ring for a center pivot irrigation machine which allows the mounting of a communication device above the span structure and/or includes a monitoring device which monitors the angle or rotation of the span structure with respect to the fixed center pivot structure.

2. Description of the Related Art

Due to increasing fuel and labor costs, the demand for remote control of mechanized irrigation systems such as center pivot irrigation systems is increasing. In those situations where the irrigation system includes remote control capabilities, it is necessary for an antenna or other communication device to be mounted at the fixed center pivot structure. One of the limitations associated with the remote control of mechanized irrigation systems is the height at which the antenna or communication device can be mounted at the center pivot structure. The height of the communication device is directly related to the quality and range of the telemetry used for remote communications. The higher the communication device is mounted, the better the signal quality and signal range. Because center pivot irrigation systems move in a full-circle rotation, communication devices such as antennas are typically mounted below the full-circle rotating span structure, which limits the mounting height of the antenna or communication device due to the height of the span structure. Communication devices such as antennas can be mounted above the span structure by electrically connecting and routing the signal wires through the slip rings of the conventional collector ring at the center pivot structure although the degradation of the signal quality is severe due to the electrical connection and routing of the signal wires through the slip rings.

FIG. 1 illustrates a prior art internal collector ring assembly commonly associated with a center pivot irrigation system. The swivel and span structure 1 rotates in a full circle with respect to the stationary center pivot structure 2. Electrical signal wires from the control panel mounted on the pivot structure are routed through the inside of the swivel 1, up the inside of the mounting tube 3 and into the collector ring assembly 4 where the signal wires are electrically connected to the slip rings so as to be routed therethrough. The mounting tube 3 is fixed to the center pivot structure and does not rotate with the swivel and span assembly 1. Control bar 5 rotates with the swivel and span structure 1 and rotates the shaft of a decoder, angle sensor or resolver mounted to the mounting tube inside the collector ring assembly, thereby providing position signals to the control panel of the system.

The structure of FIG. 1 is more specifically shown in FIG. 2 wherein a position encoder 6 is mounted on the upper end of the mounting tube 3 which is mounted to the stationary center pivot structure 2. In FIG. 2, the mounting tube 3 does not rotate. The control bar 5 is connected to the span structure 1 and rotates with the span structure thereby causing the rotation of the rest of the collector ring assembly 4. The position encoder bar 7 is mounted to the collector ring assembly 4 which is mounted to the control bar 5. As the position encoder bar 7 rotates with the span structure 1, it rotates the arm of the position encoder 6, thereby providing position information back to the control panel mounted on the center pivot structure. It is important to note that the wires 8, which extend from the pivot control panel mounted on the stationary center pivot structure, extend upwardly through the mounting tube 3 and do not rotate with the swivel and span structure. The wires 8 are connected to the slip rings of the collector ring to supply electrical power thereto. Wires are connected to the wipers or brushes 9 and extend outwardly from the collector ring assembly 4 out onto the span structure, thereby allowing the full circular rotation of the swivel and span structure without binding or twisting the wires 8 extending from the control panel. The prior art structure of FIGS. 1 and 2 does not permit the use of a communication device such as an antenna positioned above the span structure since the collector ring assembly 4 rotates with the span structure.

Certain prior art devices also have external collector ring and position encoders but the same likewise do not permit the positioning of an antenna above the span structure.

SUMMARY OF THE INVENTION

A collector ring assembly is described for use with a center pivot irrigation system which permits the mounting of a communication device above the span structure and/or which includes a monitoring device which monitors the angle or rotation of the span structure with respect to the fixed center pivot structure. The center pivot structure includes a vertically extending water supply pipe having upper and lower ends. A swivel structure is rotatably mounted on the upper end of the water supply pipe and is in fluid communication therewith. A span structure is secured to the swivel structure and extends outwardly therefrom with the span structure including a water delivery pipe supported upon one or more self-propelled drive units. A control panel is mounted on the center pivot structure and has a plurality of electrical power wires and signal wires extending therefrom. The collector ring of this invention includes an elongated, vertically disposed mounting tube, having upper and lower ends, which is fixed to the center pivot structure and which extends upwardly from the swivel structure. The swivel structure and the span structure are rotatable with respect to the fixed mounting tube. A collector ring enclosure, having upper and lower ends, is rotatably mounted on the mounting tube above the swivel structure. The upper end of the mounting tube is disposed above the upper end of the enclosure and the mounting tube has at least a first opening formed therein below the upper end of the enclosure and at least a second opening formed therein below the first opening.

A control bar or tube is secured to the collector ring enclosure and the span structure and extends therebetween whereby rotation of the span structure relative to the center pivot structure causes the collector ring enclosure to rotate with respect to the mounting tube. A collector ring assembly is positioned within the collector ring enclosure and includes a plurality of horizontally disposed and vertically spaced-apart electrically conductive collector rings or slip rings stacked one upon the other, each of which has a central opening formed therein. The mounting tube extends upwardly through the central openings in the collector rings with the electrically conductive collector rings being fixed to the mounting tube. An upstanding brush post assembly is positioned within the enclosure and has a plurality of brushes secured thereto which are in electrical contact with the collector rings. The brush post assembly is fixed to the enclosure for rotation therewith.

At least some of the electrical wires, which extend from the control panel, extend upwardly through the mounting tube and extend outwardly through the second opening in the mounting tube for electrical connection to electrical wires extending from the slip rings. The brushes have electrical wires secured thereto which extend outwardly from the enclosure for connection to electrical components on the span structure.

A horizontally disposed ring gear is mounted at the upper end of the brush post assembly for rotation therewith. A drive collar is fixed to the mounting tube at the upper end thereof and has a monitoring device secured thereto which senses the angle or rotation of the span structure with respect to the center pivot structure. The monitoring device includes a rotatable shaft extending therefrom which has a gear mounted thereon which is in mesh with the ring gear mounted on the upper end of the brush post assembly. Thus, as the brush post assembly rotates with respect to the fixed mounting tube, the ring gear causes the shaft mounted gear to rotate which rotates the shaft of the monitoring device. The monitoring device is connected to the control panel by means of electrical wires extending therefrom through the first opening formed in the mounting tube. The monitoring device may be an angle sensor, resolver, encoder, potentiometer, etc.

An optional second enclosure or cover may be mounted on the upper end of the mounting tube and which has one or more communication devices positioned thereon. At least some of the electrical and power signal wires, which extend from the control panel, extend upwardly through the mounting tube and extend into the second enclosure for connection to the communication device. The communication device may be an antenna, a radio, a directional antenna, a satellite dish, a cell phone, or a radio and antenna.

It is therefore a principal object of the invention to provide a collector ring for a center pivot irrigation machine which permits the mounting of a stationary communication device above the span structure without requiring the communication device wires to electrically pass through the collector rings of the collector ring assembly.

A further object of the invention is to provide a means for mounting a communication device on a center pivot structure so that the communication device is mounted above the span structure.

A further object of the invention is to provide a collector ring assembly, of the type described, for a center pivot irrigation machine which also includes a monitoring device which senses the angle or rotation of the span structure with respect to the center pivot structure.

These and other objects will be apparent to those skilled in the art.

DETAILED DESCRIPTION OF THE INVENTION

Figure 1:
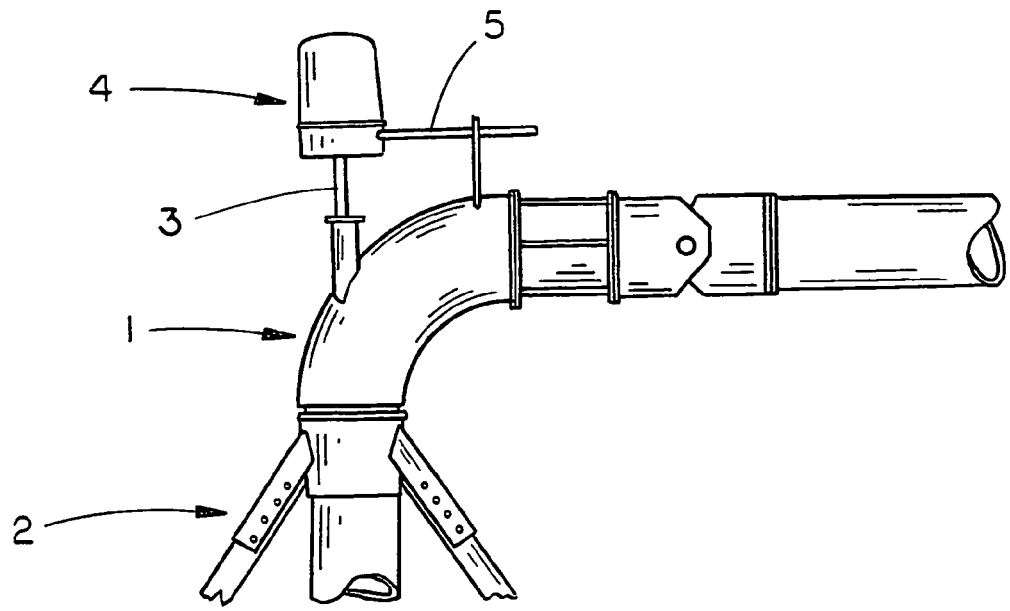
FIG. 1 is a partial side view of a prior art center pivot irrigation system.
Figure 2:
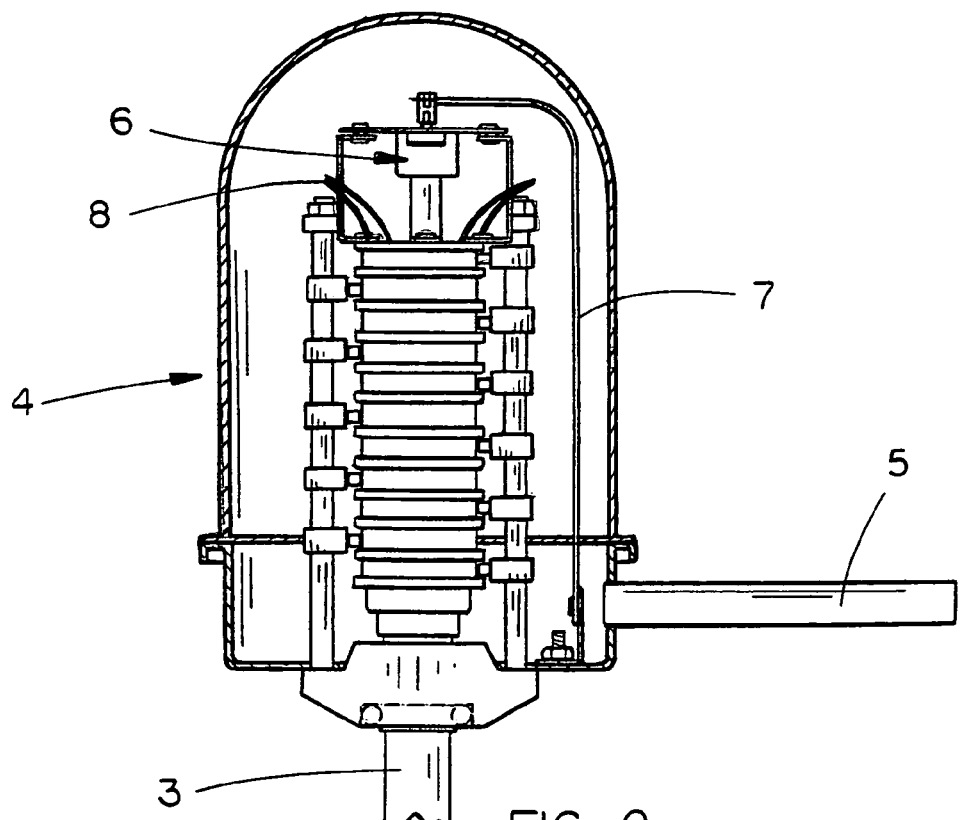
FIG. 2 is a side view of the prior art collector ring assembly of FIG. 1 with portions thereof cut away to more fully illustrate the same.
Figure 3:
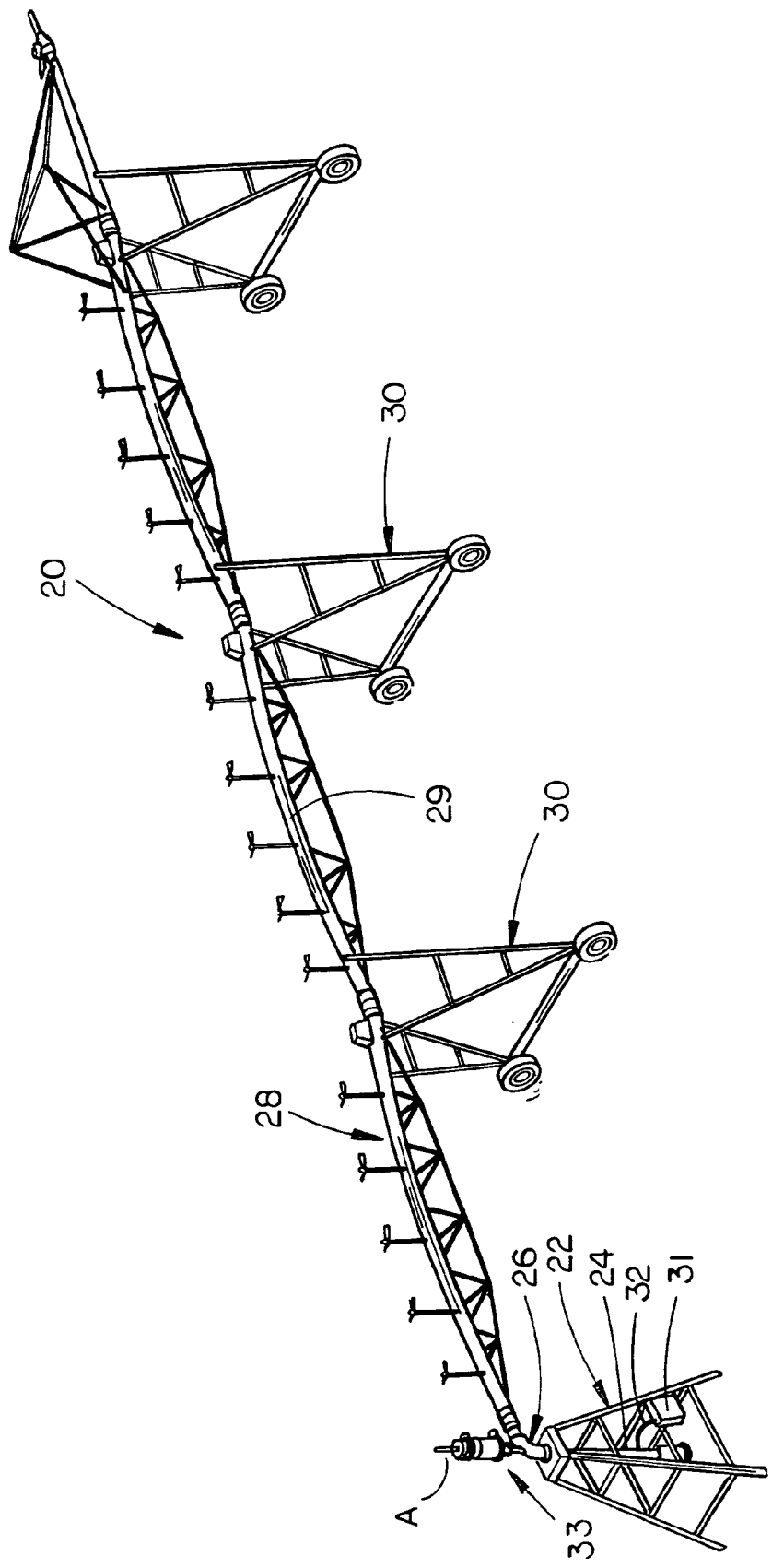
FIG. 3 is a perspective view of a center pivot irrigation system having the collector ring assembly of this invention mounted thereon and which includes an instrument which senses the angle or rotation of the span structure with respect to the center pivot structure.

In FIG. 3, the numeral 20 refers to a generally conventional center pivot irrigation system including a fixed center pivot structure 22 having a vertically disposed water supply pipe 24 provided thereon which is in communication with a source of water under pressure. A conventional swivel 26 is rotatably mounted on the upper end of the water supply pipe 24 and has a span structure 28 secured to the discharge end thereof in conventional fashion. Span structure 28 includes a water delivery pipe 29 supported upon one or more self-propelled drive units 30. Control panel 31 is mounted on the center pivot structure 22 and has a plurality of electrical signal and power wires 32 extending therefrom. The signal wires and power wires extending from the control panel 31 on the center pivot structure 22 extend into the pipe 24 and exit therefrom into a collector ring assembly 33 as will be described hereinafter.

The numeral 34 refers to an elongated, vertically disposed, hollow mounting tube or shaft having an open lower end 36 and an open upper end 38. Mounting tube 34 is fixed to the center pivot structure so that tube 34 does not rotate with the swivel 26 and span structure 28. The electrical wires 32 extend upwardly into the open lower end of the tube 34.

Collector ring assembly 33 includes a bearing housing 40 which rotatably embraces tube 34 and which has a bearing enclosed therein. Mounting base 42 is secured to the upper end of bearing housing 40 and is designed to have the lower end of an enclosure or cover 44 secured thereto with the enclosure 44 enclosing the components of the collector ring assembly. The upper end of enclosure 44 is provided with an opening formed therein which receives the tube 34 extending therethrough. Preferably, a seal 45 is positioned between the tube 34 and the opening in the upper end of the enclosure 44 to prevent moisture from entering the interior of the enclosure 44. As seen, the tube 34 is provided with one or more openings 46 formed therein below the upper end thereof.

A plurality of electrically conductive conductor rings or slip rings 48 are mounted on tube 34 in a stacked relationship and are separated by insulator rings 50. The rings 48 and 50 each have a conventional central opening formed therein which receives the tube 34 and have conventional arcuate slots formed therein outwardly of the central opening to permit electrical wires to pass therethrough in conventional fashion. The rings 48 and 50 are fixed to the tube 34 to prevent rotation thereof.

The numeral 52 refers to a brush or wiper post assembly having a plurality of brush posts 54 secured to mounting base 42 which extend upwardly therefrom in a radially spaced-apart relationship. Brushes 56 are secured to the posts 54 and have insulated electrical wires 58 secured thereto and extending therefrom. Insulated electrical wires 60 are secured to the slip rings 48 at the inside surfaces of the arcuate slots formed therein and extend upwardly therefrom through the slots formed in the slip rings 48 and insulator rings 50. Certain of the electrical wires 32 which extend upwardly through tube 34 extend outwardly from tube 34 through the opening 62 formed in tube 34 for electrical connection to the wires 60 to supply electrical power to the slip rings 48. The slip rings 48 are electrically connected to the brushes 56 in conventional fashion. Wires 59 are operatively electrically connected to the wires 58 in conventional fashion with the wires 59 extending outwardly from the enclosure 44 through the opening 63 and elbow 64, which is connected to the control arm or shaft 66, for connection to electrical components on the span structure such as motors, lights, etc.

The numeral 68 refers to a brush post extension assembly having a gear mounting plate 70 positioned at the upper end thereof. The hub 72 of ring gear 74 is fixed to plate 70 for rotation therewith. Mounting plate or drive collar 76 is positioned above plate 70 and is fixed to tube 34. Bracket 78 is secured to mounting plate 76 and extends therefrom. Resolver 80 is secured to bracket 78 and has a rotatable shaft 82 which is connected to the electrical circuitry of the resolver. Gear 84 is secured to shaft 82 for rotation therewith. Gear 84 is in mesh with gear 74, as seen in the drawings, so that rotation of plate 70 and gear 74 causes rotation of gear 84. Certain of the electrical wires 32 extend outwardly from opening 46 in tube 34 for connection to the resolver 80.

The resolver 80 senses rotational movement of the span structure 28 with respect to the center pivot 22 and supplies that information to the control panel 31. Although a resolver 80 is shown, resolver 80 could be replaced by other instruments which monitor or sense the angle or rotation of the span structure with respect to the center pivot such as an angle sensor, encoder, potentiometer, etc.

Figure 9:
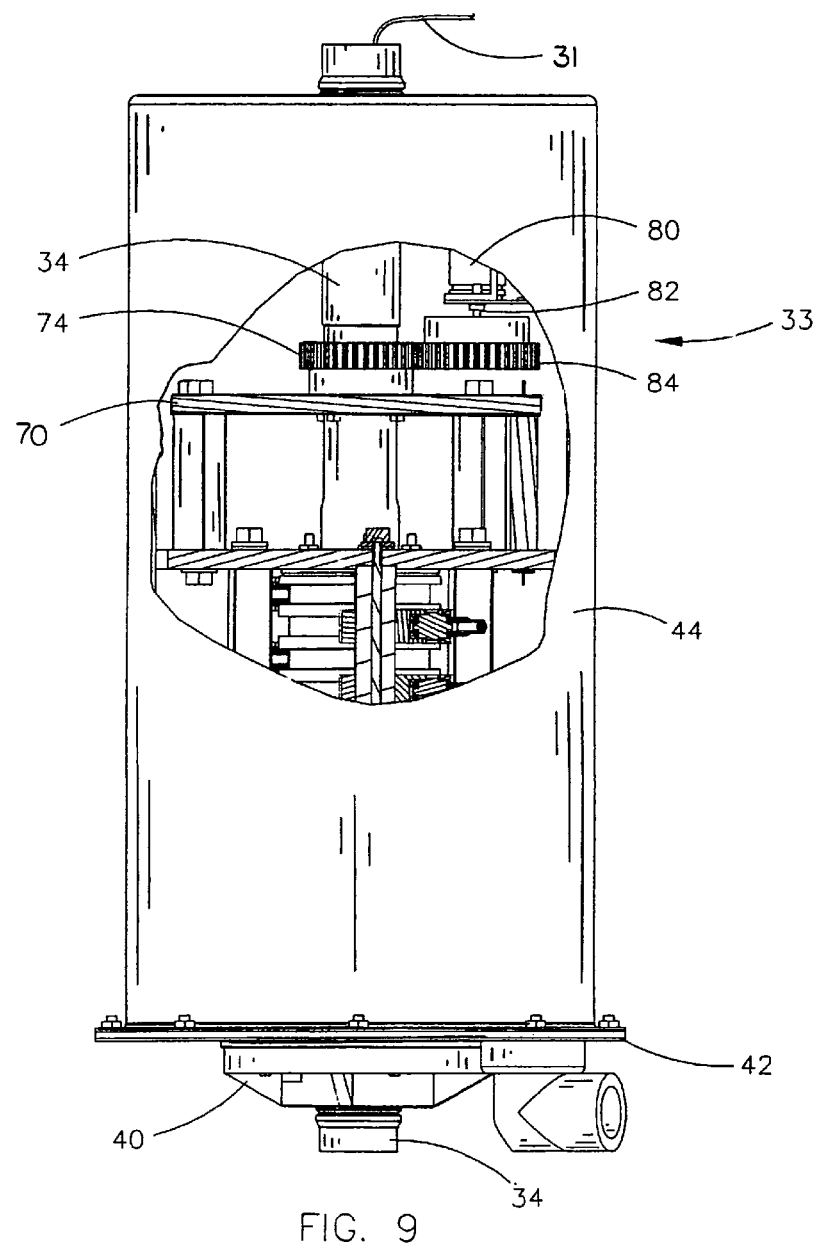
FIG. 9 is a side cut away view of the collector ring shown without the upper enclosure.

An optional enclosure or cover 86 may be utilized and has a downwardly extending tube 87 which is secured to the upper end of tube 34 above enclosure 44. FIG. 9 illustrates the collector ring wherein the upper enclosure is not utilized. Certain of the electrical wires 32, signal wires, antenna wires, etc., extend upwardly from tube 34 into the interior of enclosure 86 for connection to the components therein. Wires 88 extend from the components in enclosure 86 outwardly through nipple 90 for connection to a communication device such as antenna or antennas "A" mounted on the enclosure 86. If the enclosure 86 is not utilized, the wire or wires exiting the upper end of tube 34 will be connected to the communication device which will be operably mounted on the upper end of tube 34. The enclosure 86 may contain a radio transmitter/receiver if so desired or may simply contain the necessary components associated with the antenna "A". The communication device may be a cell phone, a satellite dish, an antenna, a directional antenna, a radio or a radio/antenna.

In operation, rotation of the span structure causes rotation of the enclosure 44 with respect to the center pivot structure 22 which causes the brush post assembly 52 to rotate. The brushes 56 slidably contact the stationary slip rings 48 so that electrical power is transferred from the slip rings 48 to the brushes 56 to enable electrical power to be supplied to the motors, lights, etc., on the span structure.

Rotation of the brush post assembly 52 causes gear 74 to rotate gear 84 of resolver 80 which supplies that information to either the control panel or the communication device at the upper end of mounting tube 34.

Figure 4:
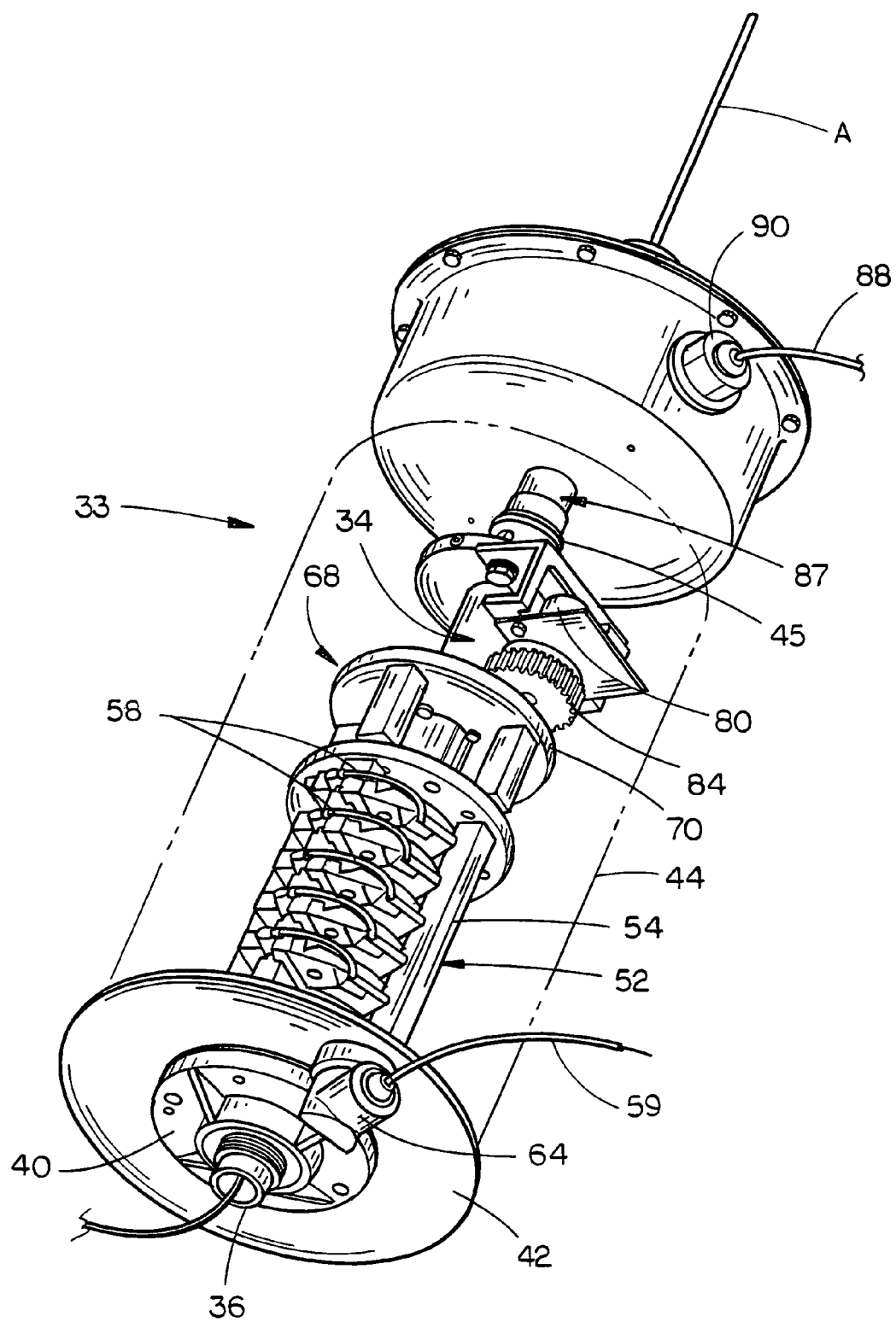
FIG. 4 is a bottom perspective view of the collector ring of this invention with an enclosure being shown in dashed lines.
Figure 5:
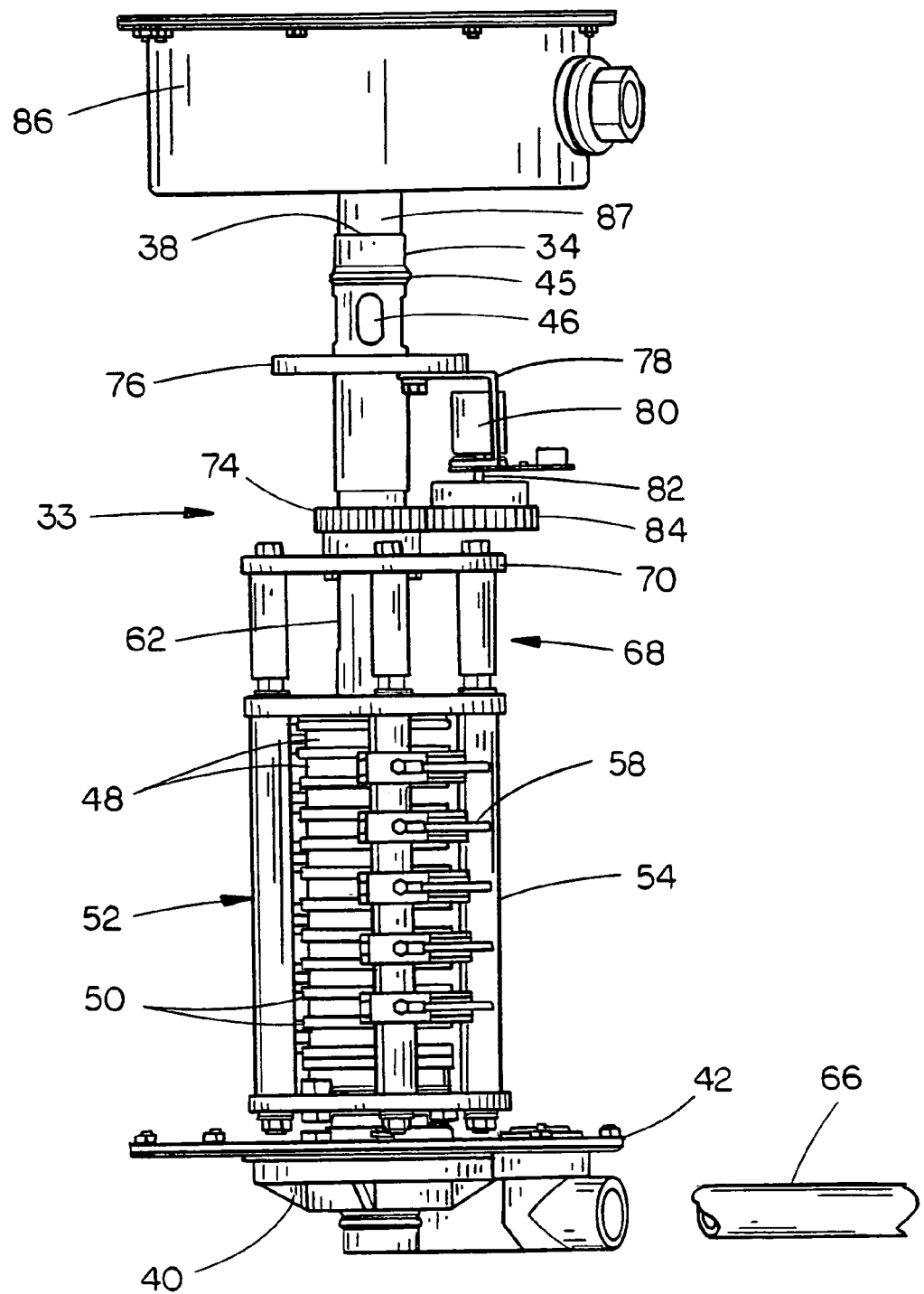
FIG. 5 is a side view of the collector ring of this invention.
Figure 6:
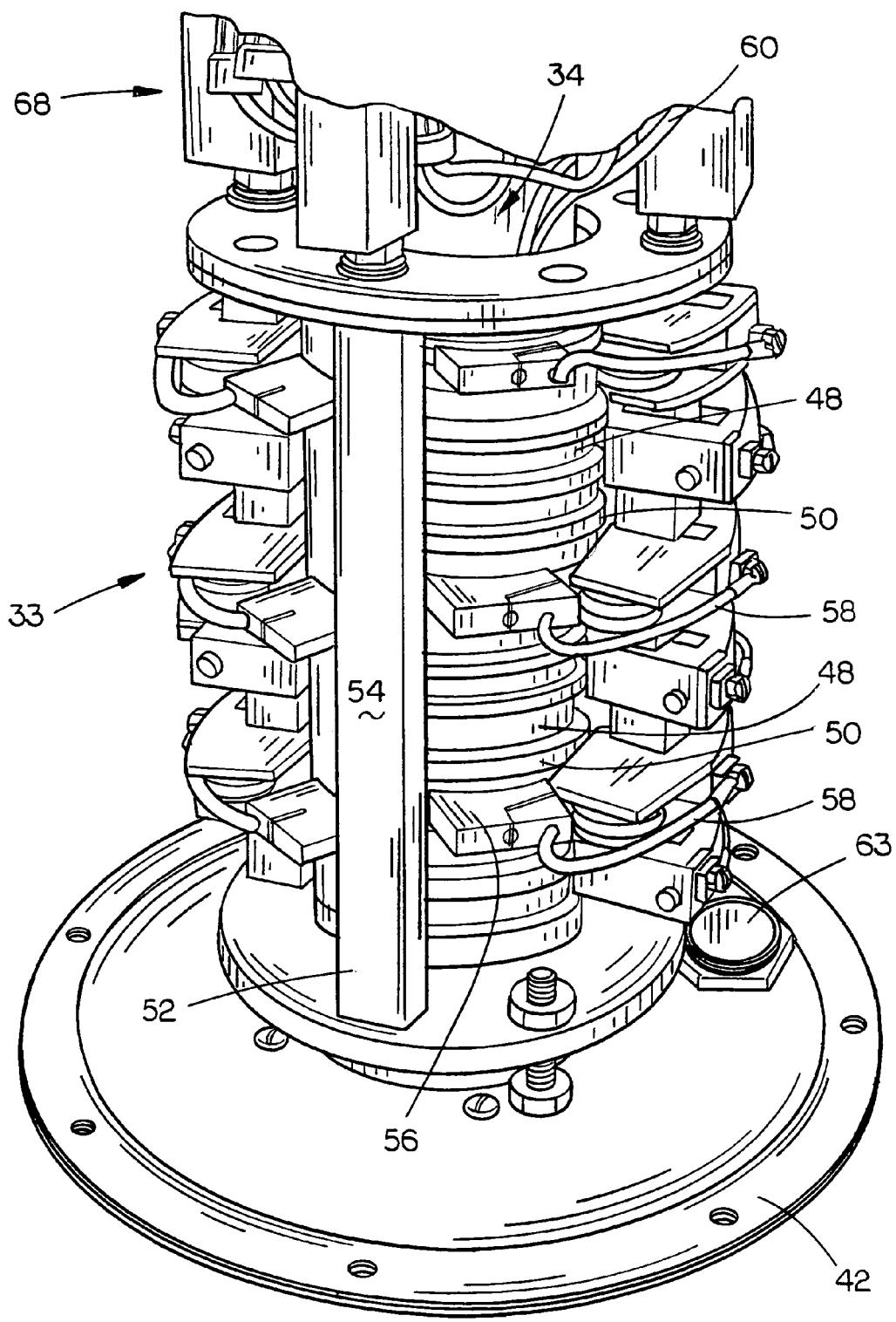
FIG. 6 is a partial perspective view of the lower end of the collector ring of this invention.
Figure 7:
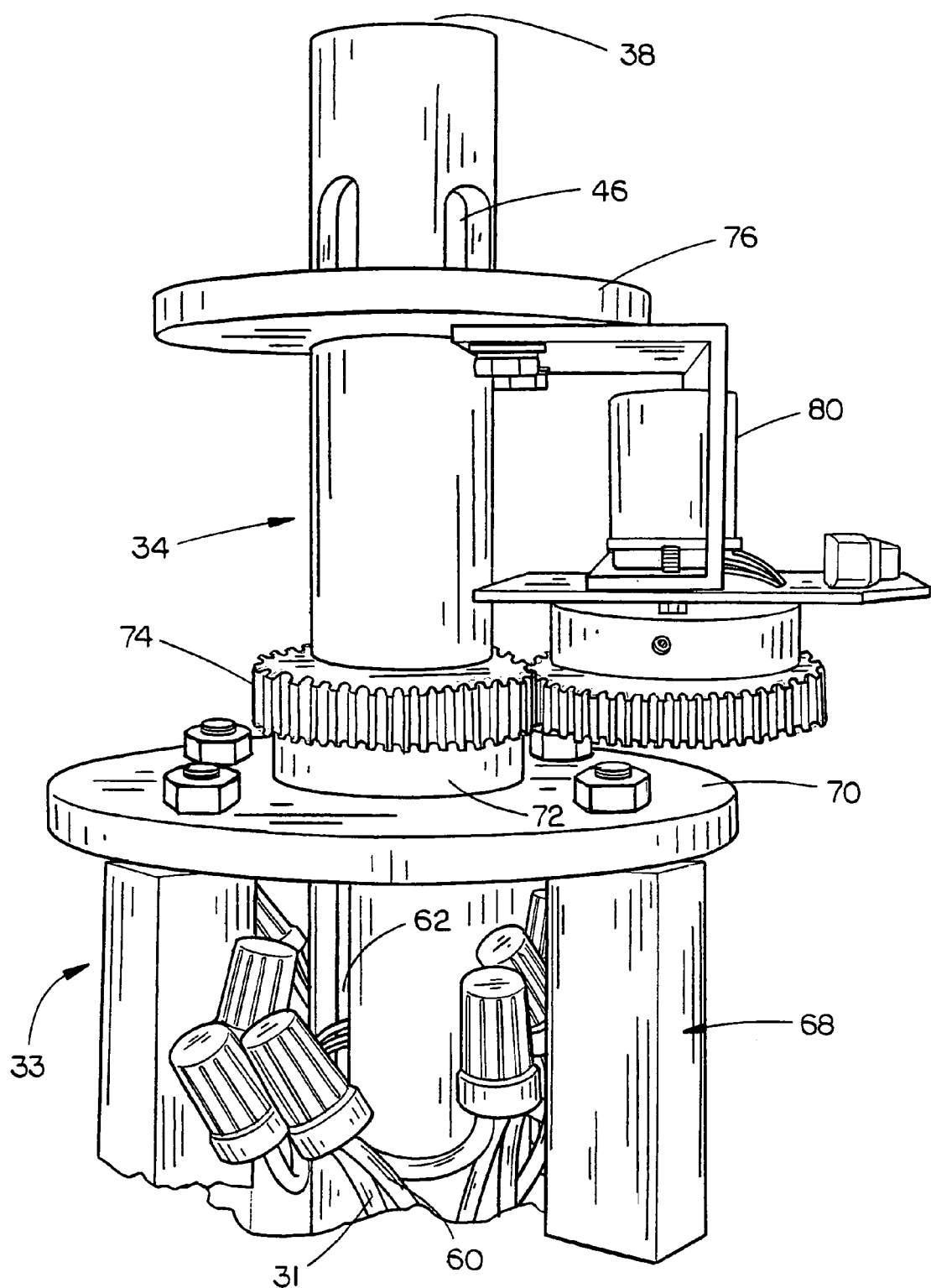
FIG. 7 is a partial perspective view of the upper end of the collector ring of this invention.
Figure 8:
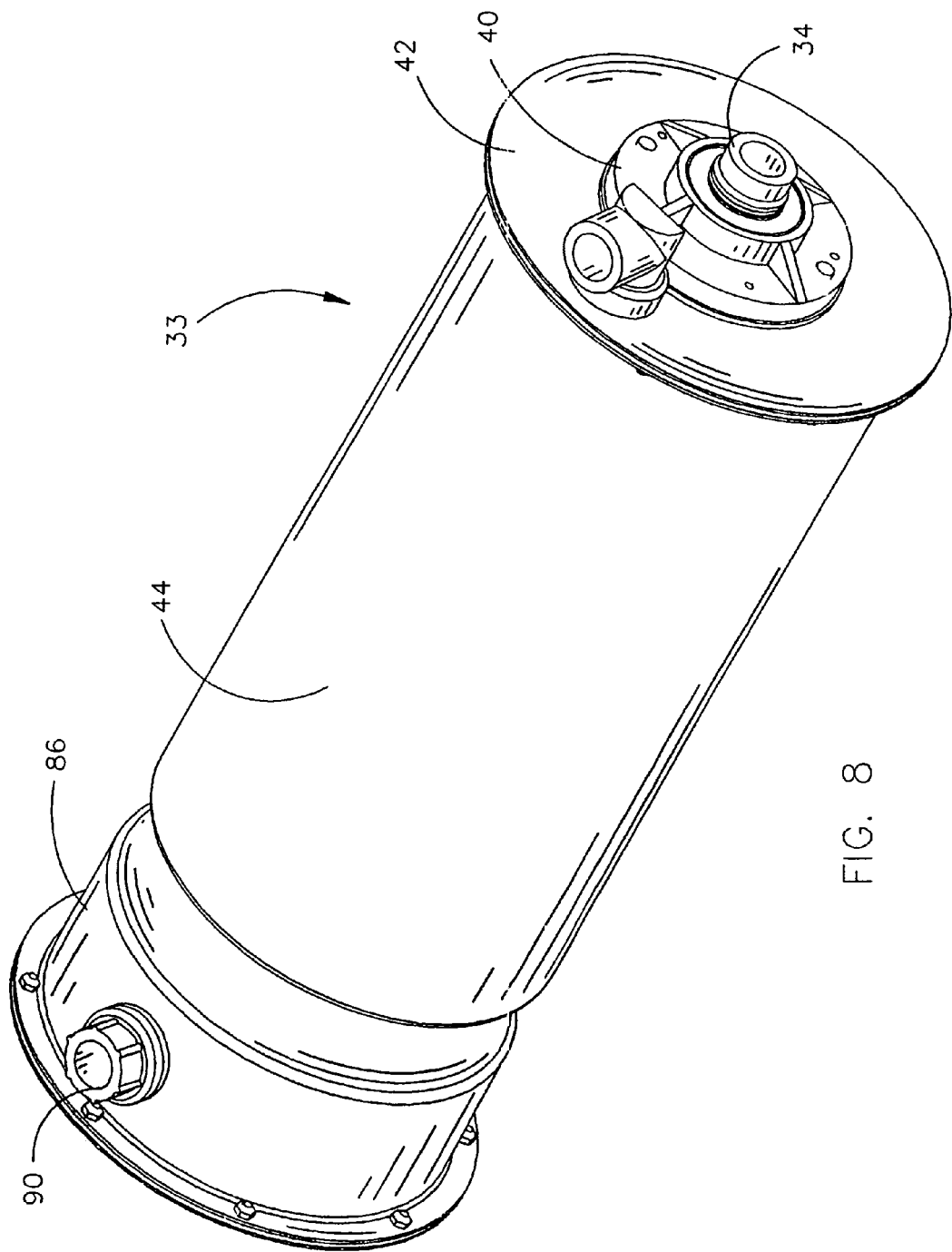
FIG. 8 is a bottom perspective view of the collector ring.

It can therefore be seen that a unique communication mounting system has been provided for a center pivot irrigation system which enables the communication device to be mounted above the span structure, as seen in FIGS. 3 and 4, rather than below the span structure thereby improving the transmitting and receiving ability of the communication device.

The fact that the electrical and/or signal wires, which extend between the communication device and the control panel, are not electrically routed through the collector ring assembly 33 prevents degradation of the signal quality of the communication device.

It can also be seen that an improved method of mounting a monitoring device within the collector ring enclosure has been provided. Although the collector ring assembly of this invention may include both a communication device and a monitoring device, both devices may not be utilized in some situations. In other words, in some situations, only a communication device will be used and in some situations, only a monitoring device will be used.

Thus it can be seen that the invention accomplishes at least all of its stated objectives.

We claim:

1. A center pivot irrigation system, comprising:
  a fixed center pivot structure including a vertically extending water supply pipe having upper and lower ends;
  a swivel structure rotatably mounted on said upper end of said water supply pipe and being in fluid communication therewith;
  a center pivot span structure secured to said swivel structure and extending outwardly therefrom;
  said center pivot span structure including a water delivery pipe supported upon one or more self-propelled drive units;
  a control panel mounted on said center pivot structure and which has a plurality of electrical and/or signal wires extending therefrom;
  an elongated, vertically disposed, hollow mounting tube, having upper and lower ends, fixed to said center pivot structure and which extends upwardly from said swivel structure;
  said swivel structure and said center pivot span structure being rotatable with respect to said hollow mounting tube;
  a collector ring enclosure, having upper and lower ends, rotatably mounted on said mounting tube above said swivel structure;
  said upper end of said mounting tube being disposed adjacent said upper end of said enclosure;
  said collector ring enclosure being connected to said span structure whereby rotation of said span structure relative to said center pivot structure causes said collector ring enclosure to rotate with respect to said hollow mounting tube;
  a collector ring assembly positioned within said collector ring enclosure;
  said collector ring assembly including a plurality of horizontally disposed electrically conductive slip rings stacked one upon the other and having a central opening;
  said mounting tube extending upwardly through said central openings in said slip rings;
  said conductive slip rings being operatively fixed to said mounting tube;
  said collector ring assembly also including a brush support fixed to said enclosure for rotation therewith;
  said brush support having a plurality of brush assemblies mounted thereon which are in electrical contact with said slip rings;
  at least some of said electrical wires, which extend from said control panel, extending upwardly through said mounting tube and outwardly therefrom for electrical connection to said slip rings;
  said brush assemblies having electrical wires secured thereto which extend outwardly from said enclosure for connection to electrical components on said span structure;
  a monitoring device in said enclosure which monitors the span position or angle with respect to said center pivot structure;
  a stationary communication device operatively secured to said mounting tube at the upper end thereof;

said monitoring device being physically interconnected to said mounting tube and said brush support;

a first ring gear rotatably embracing said mounting tube within said enclosure and which is rotatable with said enclosure;

said monitoring device including a second rotatable gear which is in mesh with said first gear;

said monitoring device being operatively fixedly secured to said mounting tube;

said monitoring device further including an electrical circuit which is driven by the rotation of said second gear as said enclosure and said first gear rotates with respect to said mounting tube.

2. The system of claim 1 wherein said stationary communication device comprises an antenna.

3. The system of claim 1 wherein said stationary communication device comprises a radio.

4. The system of claim 1 wherein said stationary communication device comprises a directional antenna.

5. The system of claim 1 wherein said stationary communication device comprises a satellite dish.

6. The system of claim 1 wherein said stationary communication device comprises a cell phone.

7. The system of claim 1 wherein said communication device comprises a radio and antenna.

8. The system of claim 1 wherein said monitoring device comprises a resolver.

9. The system of claim 1 wherein said monitoring device comprises a potentiometer.

10. The system of claim 1 wherein said monitoring device comprises an encoder.

11. The system of claim 1 wherein said monitoring device comprises an angle sensor.

12. The system of claim 1 wherein said mounting tube has a first opening formed therein below its upper end and wherein at least one of said electrical wires which extend upwardly through said mounting tube extends outwardly through said first opening for connection to said monitoring device.

13. The system of claim 12 wherein said mounting tube has a second opening formed therein below said upper end thereof and wherein at least some of said electrical wires, which extend from said control panel, extend upwardly through said mounting tube and outwardly therefrom through said second opening for electrical connection to said slip rings.

14. A center pivot irrigation system, comprising:
a fixed center pivot structure including a vertically extending water supply pipe having upper and lower ends;
a swivel structure rotatably mounted on said upper end of said water supply pipe and being in fluid communication therewith;
a center pivot span structure secured to said swivel structure and extending outwardly therefrom;
said center pivot span structure including a water delivery pipe supported upon one or more self-propelled drive units;
a control panel mounted on said center pivot structure and which has a plurality of electrical and/or signal wires extending therefrom;
an elongated, vertically disposed, hollow mounting tube, having upper and lower ends, fixed to said center pivot structure and which extends upwardly from said swivel structure;

said swivel structure and said center pivot span structure being rotatable with respect to said hollow mounting tube;

a collector ring enclosure, having upper and lower ends, rotatably mounted on said mounting tube above said swivel structure;

said upper end of said mounting tube being disposed adjacent said upper end of said enclosure;

said collector ring enclosure being connected to said span structure whereby rotation of said span structure relative to said center pivot structure causes said collector ring enclosure to rotate with respect to said hollow mounting tube;

a collector ring assembly positioned within said collector ring enclosure;

said collector ring assembly including a plurality of horizontally disposed electrically conductive slip rings stacked one upon the other and having a central opening;

said mounting tube extending upwardly through said central openings in said slip rings;

said conductive slip rings being operatively fixed to said mounting tube;

said collector ring assembly also including a brush support fixed to said enclosure for rotation therewith;

said brush support having a plurality of brush assemblies mounted thereon which are in electrical contact with said slip rings;

at least some of said electrical wires, which extend from said control panel, extending upwardly through said mounting tube and outwardly therefrom for electrical connection to said slip rings;

said brush assemblies having electrical wires secured thereto which extend outwardly from said enclosure for connection to electrical components on said span structure;

a monitoring device in said enclosure which monitors the span position or angle with respect to said center pivot structure;

said monitoring device being physically interconnected to said mounting tube and said brush support;

a first ring gear rotatably embracing said mounting tube within said enclosure and which is rotatable with said enclosure;

said monitoring device including a second rotatable gear which is in mesh with said first gear;

said monitoring device being operatively fixedly secured to said mounting tube;

said monitoring device further including an electrical circuit which is driven by the rotation of said second gear as said enclosure and said first gear rotate with respect to said mounting tube.

15. The system of claim 14 wherein said monitoring device comprises a resolver.

16. The system of claim 14 wherein said mounting tube has a first opening formed therein below its upper end and wherein at least one of said electrical wires which extend upwardly through said mounting tube extends outwardly through said first opening for connection to said monitoring device.

* * * * *